July 15, 1952   C. M. MacCHESNEY ET AL   2,603,006
PHONETIC SOUND-PRODUCING DICTIONARY APPARATUS
Filed Aug. 3, 1948   2 SHEETS—SHEET 1
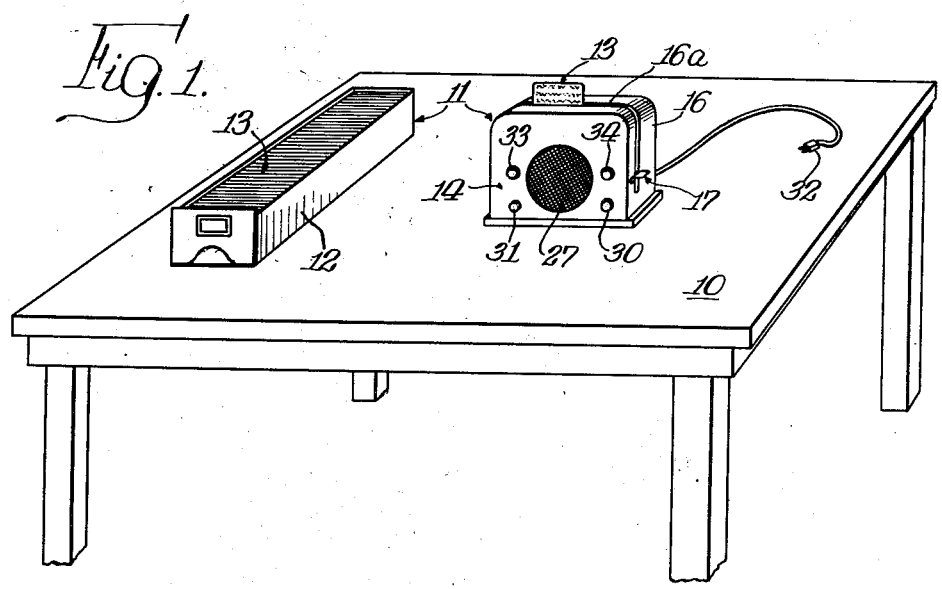
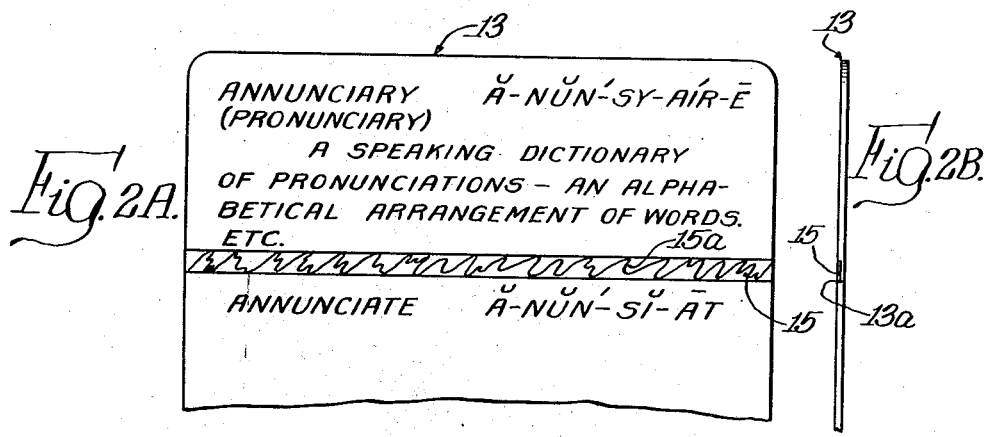
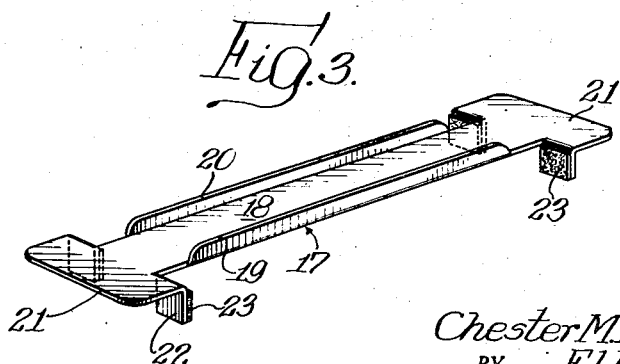
INVENTORS.
Chester M. MacChesney,
BY  Ella B. Wenger,
Smith, Olsen & Baird
Attys.

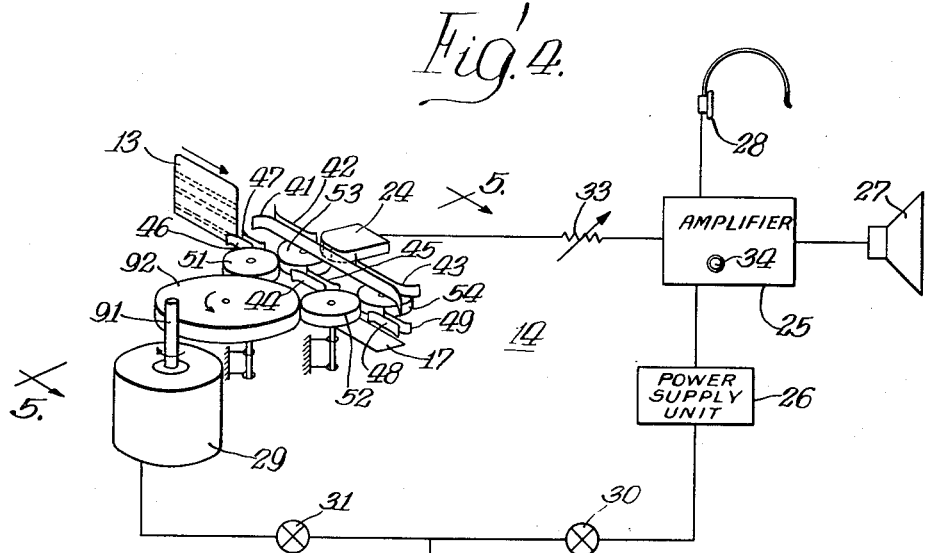
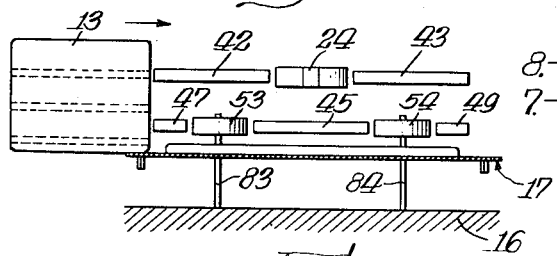
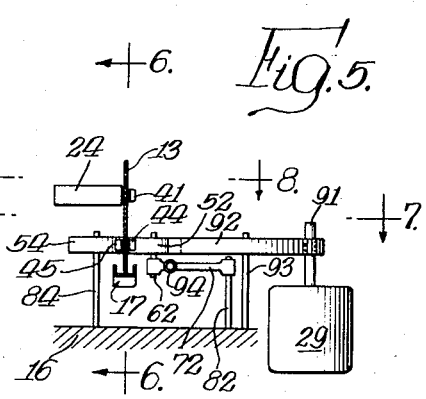
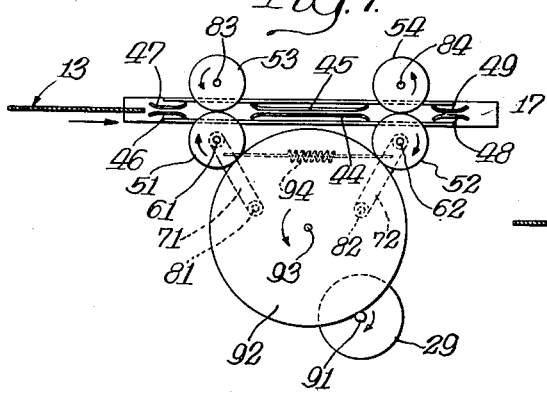
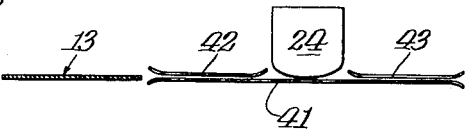
INVENTORS.
Chester M. MacChesney,
BY Ella B. Wenger,
Smith, Olsen & Baird
Attys.

Patented July 15, 1952

2,603,006

UNITED STATES PATENT OFFICE 2,603,006

PHONETIC SOUND-PRODUCING DICTIONARY APPARATUS

Chester M. MacChesney and Ella B. Wenger, Chicago, Ill., assignors to Ellamac Incorporated, Chicago, Ill., a corporation of Illinois Application August 3, 1948, Serial No. 42,274

5 Claims. (Cl. 35—35)

The present invention relates to phonetic sound producing dictionary apparatus that is especially useful in teaching languages, elocution and the like, and in establishing correct and authoritative pronunciations.

Heretofore, one source of correct pronunciations of words and phrases has been the conventional printed dictionary with its system of diacritical markings. While a conventional dictionary is useful for the purposes noted, it does not absolutely establish pronunciations since the sound interpretations given to the diacritical markings employed often vary between individuals and localities, resulting in a disparity of pronunciations and the consequent growth of dialects within a single language.

Another source of correct pronunciations of words and phrases has been the conventional phonograph apparatus. However, in this apparatus there is no visual display of a word as the corresponding phonetic sounds are produced so that there is no correlation in the mind of the listener between the spelling and the appearance of a given word and the proper pronunciation thereof. Moreover, in a conventional phonograph record there is no ready manner by which there can be predetermined the exact time at which a given word or phrase is to be audibly produced. Finally, such conventional phonograph records soon wear with use to such an extent that they are of little value for the present purposes.

Accordingly, it is a general object of the present invention to provide phonetic sound producing dictionary apparatus.

Another object of the invention is to provide improved apparatus of the character noted in which a given word or phrase is visually displayed and audibly produced simultaneously.

Another object of the invention is to provide improved apparatus of the character noted that comprises a plurality of record cards which may be conveniently and alphabetically stored as a set and readily selected for individual use as required.

Another object of the invention is to provide improved apparatus of the character noted that comprises a sound reproduction unit that is adapted to be readily and immediately controlled to produce phonetic sounds corresponding to any given word or phrase previously recorded on an associated record card.

A further object of the invention is to provide pronouncing dictionary apparatus of the magnetic medium record type that is of rugged and economical construction and arrangement and which may be readily and easily operated to produce clear phonetic sounds corresponding to authoritative pronunciations of words and phrases.

Further features of the invention pertain to the particular arrangement of the elements of the phonetic sound producing dictionary apparatus, whereby the above-outlined and additional operating features thereof are attained.

The invention, both as to its organization and method of operation, together with further objects and advantages thereof, will best be understood by reference to the following specification taken in connection with the accompanying drawings. In the drawings, Figure 1 is a perspective view of a table supporting phonetic sound producing dictionary apparatus including a plurality of record cards and a sound reproduction unit and embodying the present invention;

Fig. 2A is a greatly enlarged fragmentary front view of one of the record cards shown in Fig. 1;

Fig. 2B is a greatly enlarged fragmentary side view of the record card shown in Fig. 2A;

Fig. 3 is a greatly enlarged perspective view of a record card support and holder incorporated in the sound reproduction unit shown in Fig. 1;

Fig. 4 is an enlarged rear perspective view of one of the record cards and the mechanism incorporated in the sound reproduction unit shown in Fig. 1, as well as a schematic wiring diagram of the sound reproduction unit;

Fig. 5 is a transverse sectional view of the mechanism incorporated in the sound reproduction unit, taken in the direction of the arrows along the line 5—5 in Fig. 4;

Fig. 6 is a longitudinal sectional view of the mechanism incorporated in the sound reproduction unit, taken in the direction of the arrows along the line 6—6 in Fig. 5;

Fig. 7 is a plan sectional view of the mechanism incorporated in the sound reproduction unit, taken in the direction of the arrows along the line 7—7 in Fig. 5; and Fig. 8 is a plan sectional view of the mechanism incorporated in the sound reproduction unit, taken in the direction of the arrows along the line 8—8 in Fig. 5.

Referring now more particularly to Fig. 1 of the drawings, there is illustrated a table 10 supporting phonetic sound producing dictionary apparatus 11 embodying the features of the present invention and comprising a file 12 carrying a plurality or set of record cards 13, arranged alphabetically, and a sound reproduction unit 14. The file 12 may constitute one of a plurality adapted to be removably received in a file cabinet, not shown. In this case the group of record cards 13 arranged alphabetically in the file 12 will cover a corresponding group of the total set of record cards. The file 12 is portable and any one of the record cards 13 may be readily removed therefrom. Likewise, the sound reproduction unit 14 is portable and may be readily connected into any convenient electrical outlet, not shown.

Referring now more particularly to Figs. 2A and 2B, each of the record cards 13 comprises a substantially rectangular body sheet bearing printed matter on the front side thereof representing a plurality of given words and indicating the spellings, pronunciations and definitions of the given words. For example, the printed matter arranged on the front side of the record card 13 may set forth the items noted with reference to three given words arranged in vertically spaced-apart relation, whereby the three words are respectively arranged adjacent to the top portion, to the middle portion, and to the bottom portion of the record card 13. Specifically, the word "annunciary" appears on the top portion of the front side of the record card 13, the letters or symbols employed indicating the preferred spelling of this word. Also there appears in conjunction with this word other letters or symbols, together with diacritical markings, indicative of the preferred pronunciation of this word. Finally, there appears with this word a definition.

Also, the record card 13 carries on the front side thereof three magnetic elements or media 15 arranged in vertically spaced-apart relation and embedded in the body sheet; which three magnetic elements 15 have respectively recorded thereon groups of phonetic characters indicative of the preferred pronunciations of the three respective words. In Figs. 2A and 2B the magnetic element 15 embedded in the front of the body sheet and individually associated with the first word "annunciary" appearing on the top portion of the front side of the record card 13 is illustrated. Also, for reference purposes this magnetic element 15 is illustrated as comprising phonetic characters indicated at 15a, although it will be understood that in fact the phonetic characters recorded on the magnetic element 15 are invisible, since such phonetic characters recorded in a magnetic medium are not visible physical ponderables, but are magnetic characteristics affecting permeability in the magnetic medium.

The record cards 13 are produced in any suitable manner and bear on the front side thereof printed matter setting forth any other appropriate information with reference to the three words presented. Likewise, the three magnetic elements 15 are prepared utilizing a magnetic record device and are suitably secured to the front side of the record card 13 in proper relation with respect to the three words presented. Each of the magnetic elements 15 may take the form of a thin strip of paper carrying a coating containing fine powdered metal particles of high magnetic retentivity, such, for example, as that sold under the trade-mark "Hyflux". Preferably each magnetic element 15 is positioned in a corresponding shallow recess or groove 13a formed in the front surface of the body sheet and secured in place by utilizing a suitable non-magnetic cement. This arrangement is very advantageous as the front side of the record card 13 is smooth and the magnetic elements 15 are protected against accidental injury. Finally, if desired, thin cover strips, not shown, may be cemented to the front side of the body sheet of the record card 13 and respectively extending over the grooves 13a in order further to protect the magnetic elements 15. The body sheet of the record card 13 may be formed of any suitable non-magnetic material so that it is reasonably self-supporting, yet appropriately flexible. Specifically, the body sheet of the record card 13 may be formed of an appropriate grade of paper or of a plastic substance such, for example, as cellulose acetate.

Also, in the preparation of the record cards 13 it will be understood that, in addition to words, appropriate phrases may be presented and the presentation may be in any language or, in fact, bilingual. The preparation of the record cards 13 utilizing a bilingual arrangement of words and phrases is very advantageous in teaching a foreign language in that both the spellings, definitions and pronunciations of the words and phrases in the two languages are presented and correlated.

Referring now more particularly to Figs. 1, 3 and 4, the sound reproduction unit 14 comprises a casing 16 having a longitudinally extending slot 16a formed therein and adapted to receive any one of the record cards 13. Also the casing 16 houses an adjustable record card holder 17 arranged in cooperative relation with the slot 16a. Specifically, the holder 17 comprises an elongated body 18 carrying upwardly directed front and rear flanges 19 and 20 defining a guide channel adapted to engage the lower edge of a record card 13 inserted into the slot 16a provided in the casing 16. The body 18 terminates at opposite ends thereof in holders or tabs 21 projecting from the opposite sides of the slot 16a formed in the casing 16. Each of the tabs 21 is provided with two laterally spaced-apart and downwardly directed ears 22 to which there are secured friction pads 23 formed of felt, rubber, or the like, and engaging the casing 16 adjacent to the slot 16a formed therein. The slot 16a formed in the casing 16 is quite deep so that the card holder 17 may be readily adjusted in a vertical direction into any one of three vertical positions respectively corresponding to the vertical spaced-apart relation of the three words presented upon a record card 13. When the record card holder 17 is moved into any one of its adjusted positions utilizing the tabs or holders 21, it is frictionally restrained in its adjusted position by the engagement between the pads 23 and the sides of the casing 16 disposed adjacent to the slot 16a.

Also, the casing 16 houses a magnetic pick-up head 24 that is operatively associated with the record card holder 17. More particularly, the head 24 occupies a substantially centrally disposed position in the casing 16 that is correlated with respect to the position of the slot 16a formed in the casing 16 and to the position of the record card holder 17 carried in the slot 16a. Specifically, when the record card holder 17 occupies its lower adjusted position and a record card 13 is inserted into the slot 16a, the upper magnetic element 15 individually associated with the first word presented near the top of the record card 13 is disposed in operative relation with respect to the head 24; when the record card holder 17 occupies its middle adjusted position and a record card 13 is inserted into the slot 16a, the middle magnetic element 15 individually associated with the second word presented near the middle of the record card 13 is disposed in operative relation with respect to the head 24; and when the record card holder 17 occupies its upper adjusted position and a record card 13 is inserted into the slot 16a the lower magnetic element 15 individually associated with the third word presented near the bottom of the record card 13 is disposed in operative relation with respect to the head 24. In order to facilitate quick and ready adjustment of the record card holder 17 suitable indicia, not shown, may be carried on the sides of the casing 16 adjacent to the slot 16a formed therein.

Further, the sound reproduction unit 14 comprises an amplifier 25, a power supply unit 26, first and second sound translating devices 27 and 28, a drive motor 29, a power supply unit control switch 30, a motor control switch 31 and a plug 32 that is adapted to be inserted into a convenient electrical outlet, not shown. The sound translating device 27 may take the form of a loudspeaker, while the sound translating device 28 may take the form of a telephone receiver. The head 24 is operatively connected via a volume control device 33 to the control circuit of the amplifier 25; the power supply unit 26 is operatively connected to the circuits of the amplifier 25; and the output circuit of the amplifier 25 may be selectively connected by a switch 34 either to the loudspeaker 27 or to the receiver 28. Of course, the volume of the output circuit of the amplifier 25 will be appropriately set utilizing the volume control device 33 after the switch 34 has been operated to select either the loudspeaker 27 or the receiver 28. After the plug 32 has been inserted into an electrical outlet, not shown, the switch 30 may be operated to render operative the power supply unit 26; and the switch 31 may be operated in order to effect operation of the motor 29. In passing, it is noted that the motor 29 is utilized for the purpose of feeding a record card 13 inserted into the slot 16a formed in the casing 16 across the head 24 as explained more fully hereinafter.

Considering now in greater detail the construction and arrangement of the mechanism housed in the casing 16 and operatively connected to the motor 29 for the purpose of moving the record card 13, it is pointed out that record card guiding equipment is housed within the casing 16 in cooperative relation to the slot 16a. Specifically, this record card guiding equipment comprises, in addition to the record card holder 17, an upper rear guide 41 disposed rearwardly of the head 24 and extending outwardly on either side thereof, and upper front guides 42 and 43 respectively disposed on the right and left sides of the head 24 and extending outwardly therefrom. Also, this record card guiding equipment comprises lower central rear and front guides 44 and 45, respectively, lower right rear and front guides 46 and 47, respectively, and lower left rear and front guides 48 and 49, respectively. The lower central rear guide 44, the lower right rear guide 46 and the lower left rear guide 48 are arranged in longitudinal alignment and are disposed below the upper rear guide 41. Likewise, the lower central front guide 45, the lower right front guide 47 and the lower left front guide 49 are arranged in longitudinal alignment and are disposed respectively below the head 24, and the upper right front guide 42 and the upper left front guide 43. The guides 41, 44, 46 and 48 are thus arranged in a vertical plane disposed adjacent to the rear edge of the slot 16a; while the guides 42, 43, 45, 47 and 49 are thus arranged in a vertical plane disposed adjacent to the front edge of the slot 16a. Finally, the record card holder 17 is disposed below the guides 44, 45, 46, 47, 48 and 49. Thus, it will be understood that when a record card 13 is inserted into the slot 16a formed in the casing 16, the lower edge thereof is supported by the record card holder 17 and the record card 13 may be readily moved through the space between the various rear guides 41, 44, 46 and 48 and the various front guides 42, 43, 45, 47 and 49. Specifically, a record card 13 is inserted into the right-hand side of the slot 16a and moved therethrough and thence out of the left-hand side of the slot 16a.

The mechanism for moving a record card 13 in guided relation to the head 24 comprises, in addition to the motor 29, right and left rear friction rollers 51 and 52, respectively, and right and left front friction rollers 53 and 54, respectively. More particularly, the right rear friction roller 51 is disposed between the guides 44 and 46 and is rotatably mounted upon a spindle 61 that is, in turn, carried by an arm 71 mounted upon a pivot 81 fixedly positioned in the casing 16. Likewise, the left rear friction roller 52 is disposed between the guides 44 and 48 and is rotatably mounted upon a spindle 62 that is, in turn, carried by an arm 72 mounted upon a pivot 82 fixedly positioned in the casing 16. The right front friction roller 53 is disposed between the guides 45 and 47 and is rotatably mounted upon a spindle 83 fixedly positioned in the casing 16, while the left front friction roller 54 is disposed between the guides 45 and 49 and is rotatably mounted upon a spindle 84 fixedly positioned in the casing 16. The motor 29 carries a friction hub 91 that operatively engages a friction wheel 92 that is rotatably mounted upon a spindle 93 fixedly positioned in the casing 16. The periphery of the friction wheel 92 cooperates with the peripheries of the friction rollers 51 and 52; and the arms 71 and 72 upon which the friction rollers 51 and 52 are respectively mounted are normally biased toward each other by an arrangement including a coil spring 94 extending therebetween. The coil spring 94 not only biases the peripheral surfaces of the friction rollers 51 and 52 into engagement with the periphery of the friction wheel 92, but it also biases the peripheries of the friction rollers 51 and 52 into normal respective engagements with the friction rollers 53 and 54.

Considering now the operation of the mechanism housed in the casing 16 when operation of the motor 29 is started as a result of operation of the switch 31, the friction hub 91 is rotated in the clockwise direction effecting rotation of the friction wheel 92 in the counterclockwise direction and the consequent rotation of the friction rollers 51 and 52 in the clockwise direction, whereby the friction rollers 53 and 54 are rotated in the counterclockwise direction; all as viewed in Fig. 7. At this time when the left-hand edge of one of the record cards 13 is inserted into the right-hand side of the slot 16a formed in the casing 16 and urged toward the left, it enters between the friction rollers 51 and 53. The friction rollers 51 and 53 feed or move the record card 13 through the guides 44—45, etc., advancing the left-hand edge thereof between the friction rollers 52 and 54. The friction rollers 52 and 54 then advance the record card 13 through the slot 16a and thence out of the left-hand side thereof. Accordingly, the mechanism causes the record card 13 inserted in the right-hand side of the slot 16a to be passed therethrough and out of the left-hand side thereof, whereby the record card 13 is moved across the head 24. At this time the record card holder 17 occupies a predetermined one of its three adjusted positions, whereby the corresponding one of the magnetic elements 15 carried thereby is moved in cooperative relation across the head 24. Assuming that the switch 30 has been operated in order to render effective the power supply unit 26, and consequently the amplifier 25 and the head 24, the head 24 senses the phonetic characters recorded upon the particular magnetic element 15 moved thereacross. At this time the switch 34 may be operated to either of its positions in order to select either the loudspeaker 27 or the receiver 28, whereby the amplifier 25 causes the selected loudspeaker 27 or the receiver 28 audibly to reproduce the word or phrase recorded on the particular magnetic element 15 as it is moved across the head 24. The switch 34 may be operated to select the loudspeaker 27 for group or classroom instruction; while the switch 34 may be operated to select the receiver 28 for individual instruction, when use of the loudspeaker 27 would disturb or annoy others.

In view of the foregoing it will be understood that the particular one of the three words on the record card 13 to be audibly reproduced is selected by the adjusted position of the record card holder 17 and that, simultaneously with the audible reproduction of the selected word, the spelling of the selected word is visibly displayed upon the record card 13 just above the top of the casing 16 as the record card 13 is moved through the slot 16a formed in the casing 16. This arrangement is very advantageous in view of the fact that the general appearance of a word, as well as the spelling thereof, may be visually examined by a person as he hears the corresponding phonetic sounds thereof, whereby the visual characteristics and the audible characteristics of the selected word are simultaneously presented. This simultaneous visual presentation and audible presentation of a word is brought about by virtue of the correlation between the arrangement of the printed matter disposed on the front side of the record card and the arrangement of the corresponding magnetic medium disposed on the front side of the record card. Specifically, in conjunction with each word presented on the record card the printed matter on the front side thereof always appears above the magnetic medium on the front side thereof and is visible above the top of the casing 16 as the word is being produced.

In view of the foregoing it is apparent that there has been provided phonetic sound producing dictionary apparatus of the magnetic record type capable of presenting simultaneously in a ready and convenient manner both the visual aspects of a selected word or phrase and the proper and authentic phonetic sounds thereof.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, an upstanding record card bearing a substantially horizontal array of symbols indicative of the spelling of a given word and carrying a vertically spaced and substantially horizontal magnetic medium having magnetically recorded thereon phonetic characters indicative of the pronunciation of said given word; and a sound reproduction unit including a magnetic pick-up head, a holder for supporting said record card in its upstanding position so that said symbols are exposed to the view of an observer and so that said magnetic medium is operatively associated with said head, motor means for moving in a substantially horizontal direction said record card through said holder to cause said magnetic medium carried thereby to be moved across said head, said last-mentioned means moving said record card from right to left from the position of an observer and at a relatively slow speed so that the symbols borne thereby are legible to the observer during the movement of said record card, means for operating said head to sense said characters moved thereacross as said record card is moved through said holder, a sound translating device, and means responsive to operation of said head to sense said characters for operating said device to produce corresponding phonetic sounds.

2. The combination set forth in claim 1, wherein said sound reproduction unit further includes a casing supporting said holder and said head in cooperating relation and housing said motor means and said sound translating device.

3. In combination, an upstanding record card bearing a plurality of substantially parallel vertically spaced-apart horizontal arrays of symbols respectively indicative of the spelling of a corresponding plurality of given words and carrying a corresponding plurality of substantially parallel vertically spaced-apart magnetic media respectively having magnetically recorded thereon phonetic characters respectively indicative of the pronunciation of said given words; and a sound reproduction unit including a magnetic pick-up head, a substantially vertically adjustable holder for supporting said record card in its upstanding position so that any one of said arrays of symbols may be exposed to the view of an observer and so that the corresponding one of said magnetic media is operatively associated with said head, motor means for moving in a substantially horizontal direction said record card through said holder to cause the corresponding one of said magnetic media carried thereby to be moved across said head, said last-mentioned means moving said record card from right to left from the position of an observer and at a relatively slow speed so that said one array of symbols borne thereby is legible to the observer during the movement of said record card, means for operating said head to sense the characters recorded on said one magnetic medium moved thereacross as said record card is moved through said holder, a sound translating device, and means responsive to operation of said head to sense the characters recorded on said one magnetic medium for operating said device to produce corresponding phonetic sounds.

4. A sound reproduction unit comprising a record card holder adapted to receive and to support in an upstanding position a record card bearing a substantially horizontal array of symbols indicative of the spelling of a given word and carrying a vertically spaced and substantially horizontal magnetic medium having magnetically recorded thereon phonetic characters indicative of the pronunciation of the given word, a magnetic pick-up head operatively associated with said record card holder, a friction drive operative to engage and to move in a substantially horizontal direction a record card supported by said record card holder to cause the magnetic medium carried thereby to be moved across said head, motor means for operating said friction drive, said friction drive moving the record card from right to left from the position of an observer and at a relatively slow speed so that the symbols borne thereby are legible to the observer during the movement of the record card, means for operating said head to sense phonetic characters recorded on a magnetic medium moved thereacross as a record card is moved through said holder, a sound translating device, and means responsive to operation of said head to sense phonetic characters for operating said device to produce corresponding phonetic sounds.

5. A sound reproduction unit comprising a casing, a record card holder carried by said casing and having a substantially horizontal slot formed therein and adapted to receive in an upstanding position a record card bearing a substantially horizontal array of symbols indicative of the spelling of a given word and carrying a vertically spaced and substantially horizontal magnetic medium having magnetically recorded thereon phonetic characters indicative of the pronunciation of the given word, a magnetic pick-up head carried by said casing in cooperating relation with said holder, said holder being adapted to receive an edge of a record card inserted into said slot and to support the record card in an upstanding position so that the symbols borne thereby are exposed to the view of an observer and so that the magnetic medium carried thereby is operatively associated with said head, motor means housed in said casing for moving in a substantially horizontal direction a record card supported by said holder to cause the magnetic medium carried thereby to be moved across said head, said last-mentioned means moving the record card from right to left from the position of an observer and at a relatively slow speed so that the symbols borne thereby are legible to the observer during the movement of the record card, means for operating said head to sense phonetic characters recorded on a magnetic medium moved thereacross as a record card is moved through said holder, a sound translating device housed in said casing, and means responsive to operation of said head to sense phonetic characters for operating said device to produce corresponding phonetic sounds.

CHESTER M. MacCHESNEY.
ELLA B. WENGER.

REFERENCES CITED

The following references are of record in the file of this patent:

UNITED STATES PATENTS

| Number | Name | Date |
|---|---|---|
| 2,228,782 | Sharples | Jan. 14, 1941 |
| 2,275,609 | Bryce | Mar. 10, 1942 |
| 2,357,455 | Bryce | Sept. 5, 1944 |
| 2,369,572 | Kallmann | Feb. 13, 1945 |
| 2,427,388 | Bryce | Sept. 16, 1947 |
| 2,457,699 | Marsen | Dec. 28, 1948 |

FOREIGN PATENTS

| Number | Country | Date |
|---|---|---|
| 27,763 | Great Britain | Nov. 29, 1910 |